(12) United States Patent
Prokhorov et al.

(10) Patent No.: US 11,019,764 B2
(45) Date of Patent: Jun. 1, 2021

(54) COMPACT STANDARDIZED GRAIN GERMINATOR

(71) Applicant: VOLGIN LLC, Pearland, TX (US)

(72) Inventors: Alexander Vladimir Prokhorov, Pearland, TX (US); Alexandra Andrejevna Volguina, Pearland, TX (US); Andrei Yurievitch Volgin, Pearland, TX (US); Irina Vasilievna Volguina, Pearland, TX (US); Kirill Andrejevitch Volguin, Pearland, TX (US)

( * ) Notice: Subject to any disclaimer, the term of this patent is extended or adjusted under 35 U.S.C. 154(b) by 219 days.

(21) Appl. No.: 15/781,678

(22) PCT Filed: Dec. 21, 2015

(86) PCT No.: PCT/US2015/067056
§ 371 (c)(1),
(2) Date: Jun. 5, 2018

(87) PCT Pub. No.: WO2017/111897
PCT Pub. Date: Jun. 29, 2017

(65) Prior Publication Data
US 2019/0000008 A1    Jan. 3, 2019

(51) Int. Cl.
*A01C 1/02* (2006.01)
*A01G 9/00* (2018.01)
*A01C 1/04* (2006.01)

(52) U.S. Cl.
CPC . *A01C 1/02* (2013.01); *A01C 1/04* (2013.01)

(58) Field of Classification Search
CPC .... A01C 1/00; A01C 1/02; A01C 1/04; A01G 9/00; A01G 2009/003; A01G 9/14
See application file for complete search history.

(56) References Cited

U.S. PATENT DOCUMENTS

| | | | | |
|---|---|---|---|---|
| 4,285,162 | A * | 8/1981 | Hilton | A01G 9/1438 47/29.1 |
| 4,369,598 | A * | 1/1983 | Beckwith | A01G 9/024 47/61 |
| 4,858,380 | A * | 8/1989 | Gayle | A01G 13/0237 47/45 |
| 2001/0032415 | A1 * | 10/2001 | Jarrell | A01G 31/02 47/58.1 SE |
| 2009/0077873 | A1 * | 3/2009 | Petersen | G01N 33/0098 47/14 |
| 2012/0137581 | A1 * | 6/2012 | Teasdale | A01G 9/0297 47/66.6 |
| 2013/0212940 | A1 * | 8/2013 | Blyden | A01G 9/022 47/65.8 |

(Continued)

*Primary Examiner* — Monica L Barlow
(74) *Attorney, Agent, or Firm* — Law Offices of Kevin M. Jones & Associates, LLC

(57) ABSTRACT

A seed germinating container allowing germination of seeds under controlled circumstances. The container may make use of a lid containing an opening covered by a mesh strainer allowing for easy removal of water during washing of seeds. The opening is sealable with a cover which may be opened to a variable degree. A seed elevating mesh may support the seeds at a controlled height above the bottom of the container. A porous seed bag containing a measured portion of seeds may be inserted into the germinator for further precision and cleanliness of the germination container.

7 Claims, 2 Drawing Sheets

(56) References Cited

U.S. PATENT DOCUMENTS

| | | | |
|---|---|---|---|
| 2014/0237895 A1* | 8/2014 | Samadpour | A01G 9/02 47/58.1 R |
| 2016/0198654 A1* | 7/2016 | Lonergan | A01G 22/00 47/61 |
| 2016/0262321 A1* | 9/2016 | Wang | A01G 27/06 |
| 2017/0215351 A1* | 8/2017 | Kremer | A01G 9/02 |
| 2018/0325055 A1* | 11/2018 | Krakover | A01G 31/06 |
| 2018/0368344 A1* | 12/2018 | Marshall | A01G 31/02 |

* cited by examiner

COMPACT STANDARDIZED GRAIN GERMINATOR

BACKGROUND OF THE INVENTION

Background of the Invention

This invention relates to the germination of seeds for consumption.

The grain prepared for consumption by current methods is not optimized to provide nutritional benefits. While the grain is dormant it stores a large proportion of its sugars and other nutrient containing compounds in inactive forms for long term storage. These compounds are converted to more easily metabolized forms when the grain begins the process of germination. Food preparatory methods which use grain which was not germinated before use yield a product which is much harder for the body to metabolize.

In addition, grain which is sterilized before shipping or storage loses many of its short life factors which decay quickly in the absence of active biochemistry to maintain them. Beneficial spores or bacteria which may serve to supplement and balance the microbiome of the human digestive system and provide important health benefits are killed by sterilizing processes.

Historically, grain sprouters have been used to prepare grain for planting or in attempt to provide more nutrient rich grain for consumption. However, these sprouters typically allow the plant to proceed in development until they reach the chlorophyll producing phase of its life cycle. Grain sprouts in the chlorophyll producing phase are not optimized to produce nutrients, growth factors, and healthy enzymes.

Prior to reaching the chlorophyll phase the grain contains healthy bacteria for gut nutrition and is not influenced significantly by external bacteria introduced through the environment. After the chlorophyll producing phase in the grain's life cycle begins, many of the key health benefits are lost, as nutritional compounds have been consumed and the compounds in use by the plant no longer resemble closely those metabolized by the human body.

As such, there is a need for a germinating device that prepares the seed to take advantage of this phase in the life cycle of the grain. This requires a grain germinating device capable of standardized preparation of seeds with predictable and consistent results which can take advantage of this critical phase.

In addition to their unpredictability, current grain sprouting devices have problems with portability, cleaning, and convenience. Many grain sprouters are industrial in nature and not designed for use by a single household. Of those that are portable, there is often difficulty cleaning the device due to complicated disassembly.

In addition, sprouting the grain can be time consuming due to difficulty controlling the water level of the sprouter, or difficulty removing water without loss of the grain or spills. If the grain sits submerged in water for long periods this can promote the growth of mold and prevent the seeds from receiving enough aeration to successfully sprout.

SUMMARY OF THE INVENTION

Figure 1:
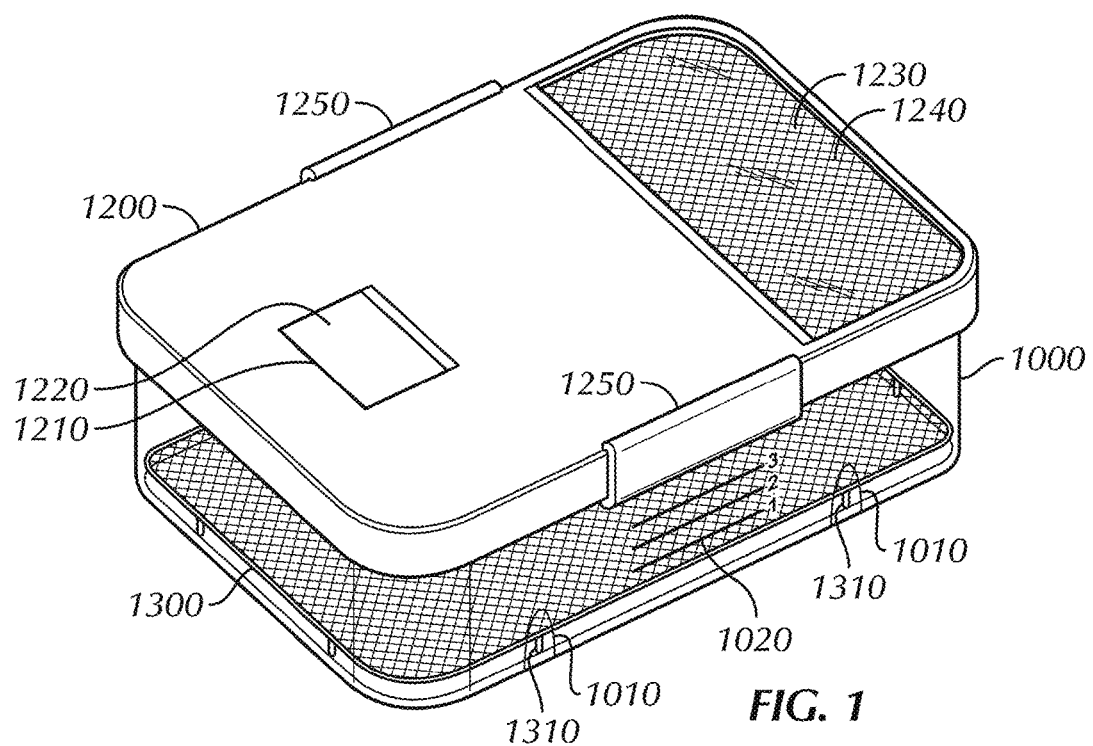
FIG. 1 illustrates a seed germinator in sealed position in accordance with an exemplary embodiment of the invention.

The objectives of the germinator described herein are to provide a standardized, convenient, and portable germinator for preparation of seeds. The container size may be varied while retaining the desired proportions of air, water, and grain, but can be appropriately sized to fit into a refrigerator, allowing the life cycle of the seeds to be stalled as desired, and allowing for storage of grain within the container itself after germination.

The mesh placed over the opening of the container allows the container to be rinsed with a continuous flow of water without dislodging the seeds from the container. The mesh net support, which may be placed in the bottom of the container, allows the grain to be supported at a level within the container which is only partially submerged, decreasing the chance of mold growth and providing a means to keep the seeds sufficiently aerated.

In addition, this allows for more long term storage of the grain without loss of integrity. Water can likewise be emptied out easily to prolong the length of the storage period. Markings for measurement of the water level along with the ability to switch between hermetically sealed, partially open, and completely open positions of the container lid allow further precise control of the ratio of air and water.

Finally, the use of precisely measured bags of grain with a porous exterior allows the user to accurately estimate how long the grain will take to germinate and what ratios of air and water are required to ensure proper germination to the desired point. The use of seed bags has the added advantage of allowing easy removal of the grain from the germinator, allowing the use of specially selected grains most suitable for controlled germination, and eliminating the need for the user to measure out the desired portion of grain.

The user may carry out a carefully controlled and standardized process of germination within the container, which allows for germination of exotic or delicate seeds which would otherwise be difficult for the user to develop due to the need to use trial and error to determine proper germination times for new varieties of seeds in seed sprouters. In addition, the increased precision of this design allows the development of seeds consistently to a desired period within their life cycle.

In a typical germination procedure, a measured volume of seeds are inserted into the germination container. The germination container may be transparent to allow light to enter, or opaque as needed, to optimally facilitate germination. The germination container may employ interchangeable transparent and opaque germination container lids. The seeds may be grains or other seeds desired by the user, and the process of using the container may be varied to suit the type of seeds being employed.

The standardized nature of the germination container allows it to be adapted to germination of exotic or delicate seeds and grains as processes can be developed and provided for use with the container to successfully germinate seeds which would otherwise be difficult to prepare. Results may be tested and then reproduced by others, allowing the germination container to be used with seeds for which no germination process is currently common knowledge due to the rarity of use or for which germination times may vary widely due to slight variations in container size or design.

The seeds may be contained in a seed bag, which allows for easy transfer of seeds to the germination container. The seeds may be added directly to the germination container, or a seed elevating mesh may be placed at the bottom of the container to support the seeds at a desired elevation above the water or at an elevation at which they will be partially or entirely submerged within the water at a desired depth.

The height of the seed elevating mesh may be set by supporting the mesh on a mesh supporting frame. The height of the frame may be adjustable by the user to allow the user to employ the same frame at multiple elevations within the container.

Alternatively, or in combination with the use of a mesh supporting frame, the mesh frame may be attached at one or more frame attachment points to the germination container. The germination container may employ multiple frame attachment points at a range of heights above the bottom of the germination container.

The seed elevating mesh, frame attachment points, or mesh supporting frame may be designed to lock the seed elevating mesh into position such that inverting or shifting the germination container does not cause the seed elevating mesh to move within the germination container.

A volume of water suitable to begin germination of the seeds is added to the container. The volume of water used may be varied based on the height of the seed elevating mesh, the volume of seeds used, the type of seed the user wishes to germinate, the age of the seeds, and the targeted stage of germination, along with any other factors that may be relevant to determining the optimal water level for germination.

The germination container may alternatively be used with other fluids such as a nutrient enriched fluid in order to facilitate germination. The volume of fluid to be added may be premeasured, or measuring markers may be present within or on the surface of the germination container.

Once fluid is added to the germination container the seeds are left to soak for an optimal period of time. During this period the grains increase in size, the grains activate, and germination begins. The germination container lid may be used to hermetically seal the germination container during this time period to prevent gas exchange or spillage, or may be used to loosely cover the germination container while still allowing exchange of gases.

The first opening may be in opened or closed position, and the second opening cover may be set in open, partially open, or closed positions in order to control the rate of gas exchange within the germination container. The second opening of the cover may be adjustable to a range of partially open positions for increased control.

Once the soaking period is completed, the fluid is drained from the germination container. This is accomplished by placing the second opening cover of the germination container lid into open position, and allowing water to drain by tilting or inverting the germination container.

The use of a removable mesh strainer within the second opening allows the drainage to be accomplished while retaining free seeds or seed bags within the germination container, allowing the fluid to be conveniently drained without disassembling the container.

The grain is then washed or rinsed repeatedly to remove dirt and microorganisms. The water may be added to the germination container by opening the spout of the first opening, or alternatively by removal of the mesh strainer covering the second opening. The water is then drained through the mesh strainer of the second opening to complete rinsing. Rinsing may be repeated multiple times.

After the rinsing is concluded, the germination container is drained of water and the grain is allowed to aerate for a period of time to begin cellular respiration and allow growth of the seed. As in soaking, the germination container lid is sealed, and the second opening cover may be set open to a desired degree to control gas exchange. Every 12 hours the grains should be rinsed to prevent mold or bacteria from accumulating within the grain. Rinsing is carried out as described at the conclusion of the soaking period.

At the conclusion of the aeration period, the grain is rinsed one final time, and the grain may then be stored in the container. In order to stall germination while keeping the grain alive to preserve short life factors and active biochemistry, the germination container may be placed in a refrigerator for storage.

The second opening cover of the germination container lid may be left partially open in order to allow gas exchange and prevent fermentation, while the tightly controlled exchange of gas may slow drying and mold growth within the container and allow for extended storage within the refrigerator.

DETAILED DESCRIPTION OF THE PREFERRED EMBODIMENTS

Figure 2:
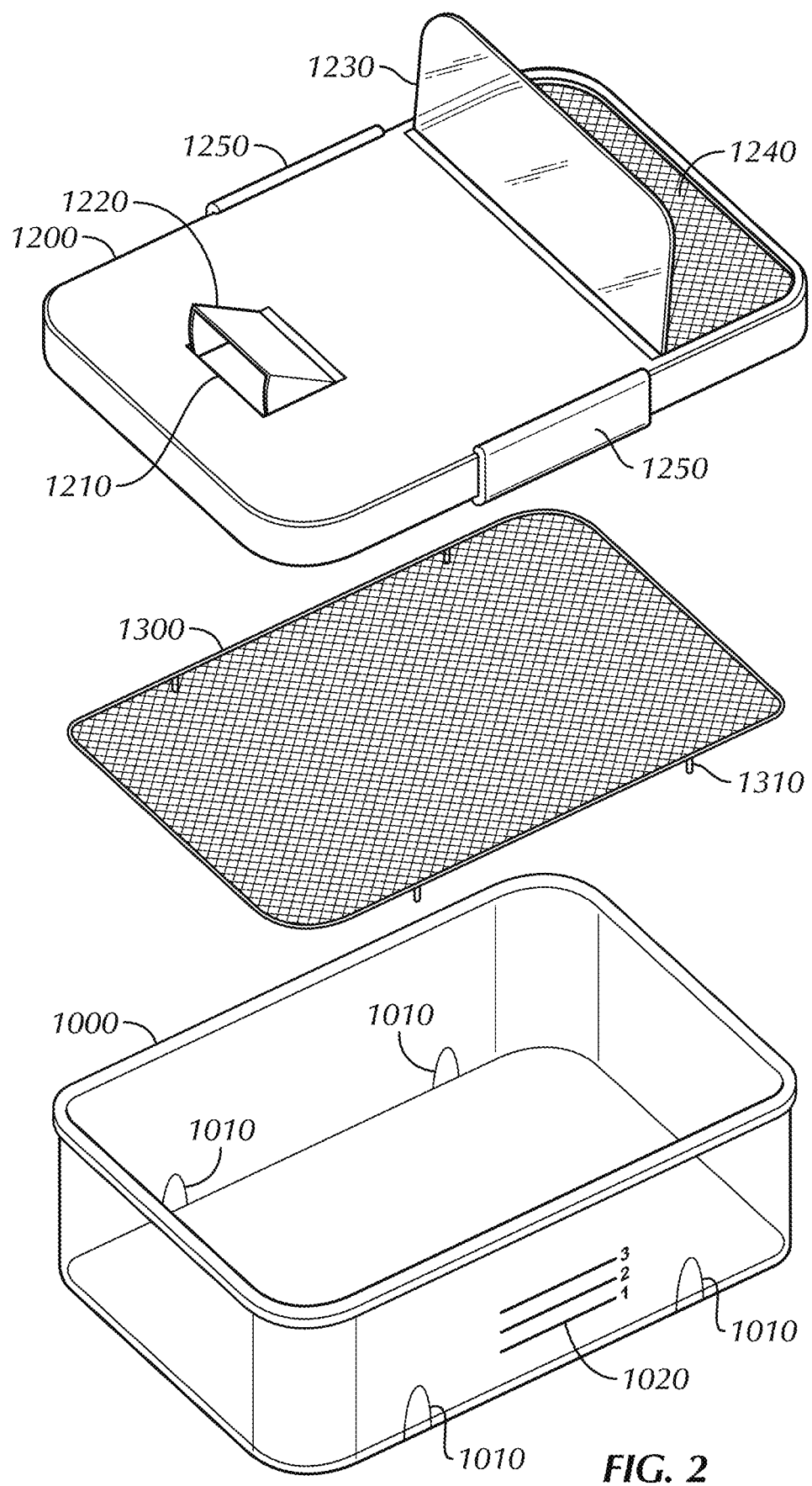
FIG. 2 illustrates a seed germinating container with the lid removed, employing a seed bag in accordance with an exemplary embodiment of the invention.

As shown in FIGS. 1-2, an embodiment of the seed germinator disclosed comprises a germination container 1000, a germination container lid 1200, and a seed elevating mesh 1300. The germination container 1000 is configured such that the seed elevating mesh 1300 is able to be inserted into the container at one or more frame attachment points 1010.

These frame attachment points 1010 may allow attachment of the seed elevating mesh 1300 at variable heights in order to allow the height of the seed elevating mesh 1300 to be adjusted, depending on what water level is desired for germination and whether the seeds should be partially or completely submerged at the current point in the germination process for optimal results.

Additionally, the frame attachment points 1010 may allow the seed elevating mesh 1300 to be locked into place so that it will not be dislodged by rinsing or emptying the seed germinating container 1000 of seeds. The seed germination container 1000 may employ measuring markers 1020 in order to precisely estimate the volume of the water used or the height of the seed elevating mesh 1300 within the container.

The seed elevating mesh 1300 may be inserted into the container to suspend the seeds at a desired level above or within the water employed in the germination process. The seed elevating mesh 1300 may be raised to a desired level by anchoring it directly to the walls of the germination container 1000, or may be held in place by a mesh supporting frame 1310 which may be attached to the seed germination container 1000 at one or more frame attachment points 1010.

The germination container lid 1200 is configured to cover the top of the germination container 1000. The germination container lid 1200 may be configured to seal hermetically to bar entry of air or contaminants into the container during the germination process. This sealing may involve a clasp such as a lid seal 1250, which snaps into place to apply pressure to the germination container lid 1200 and hold it in place on top of the germination container 1000. In one embodiment, the germination container lid 1200 contains a first opening 1210 and a second opening 1240.

The first opening 1210 may be used to input water into the germination container 1000. The first opening 1210 may contain a spout 1220, which may be configured into an open (FIG. 2) or closed (FIG. 1) position. In open position, the spout 1220 allows water to enter into the germination container 1000. In closed position, the first opening 1220 may be sealed such that neither air nor water may enter or escape through the opening.

The second opening 1240 may be used to allow water to exit the germination container 1000. The second opening 1240 may optionally be covered by a mesh strainer, which allows water to exit the container freely while retaining seeds for further germination steps, allowing for ease of washing and water replacement. The second opening 1240 may be covered by a second opening cover 1230, which can be configured into a fully open, partially open, or sealed position.

In fully open position, the second opening cover 1230 is opened to its maximum extent allowing water to flow out, or in order to allow full aeration of the container. In the partially open position, the second opening cover 1230 is opened sufficiently to allow aeration, but still closed sufficiently to prevent large dust particles or other contaminants from entering the germination container 1000.

In another embodiment, the functions of the first opening 1210 and the second opening 1240 may be combined, such as by making the mesh strainer of the second opening removable to allow water to flow freely into the container.

Figure 3:
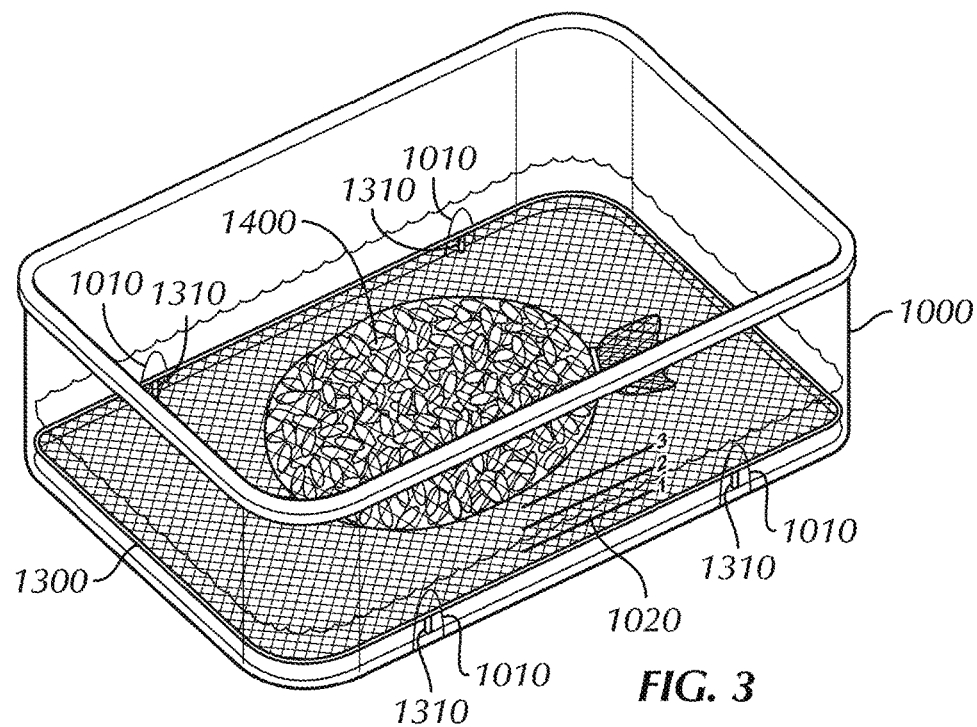
FIG. 3 shows an exploded view of a seed germinator with the germination container, germination container lid, and seed elevating mesh separated for viewing in accordance with an exemplary embodiment of the invention.

As shown in FIG. 3, the germination container 1000 may be used in combination with a seed bag 1400. The seed bag 1400 may be formed of a porous material such as, but not limited to filter paper, silk, or food grade plastic mesh to allow for exchange of air and water through its surface. The seed bag 1400 may contain a precisely measured portion of grain to allow the user to more accurately estimate the speed of the germination process.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A grain germinator comprising;
   a germination container;
   a germination container lid, where the germination container lid contains an opening covered by a mesh strainer to allow water to exit the container while retaining solid contents of the container;
   a seed elevating mesh, where the seed elevating mesh allows seeds to be suspended at a controlled height above the bottom surface of the container,
   where the height of the seed elevating mesh within the seed germinating container is adjustable to a plurality of positions.

2. A grain germinator as described in claim 1, where the germination container lid opening may be covered by a lid seal, where the lid seal may be opened to a variable extent to allow outflow of water or control aeration of the contents of the container.

3. A grain germinator as described in claim 2, where the mesh strainer is removable to allow free inflow of water without spillage.

4. A grain germinator as described in claim 2, where the germination container lid may further comprise a second opening, which may be placed into a sealed position or an open position allowing for free inflow of water without spillage.

5. A grain germinator as described in claim 1, further comprising;
   a seed bag containing a measured portion of seeds for germination, where the seed bag is made of a porous material allowing for aeration and flow of water through the bag.

6. A grain germinator comprising; a germination container; a germination container lid; and a seed elevating mesh, where the seed elevating mesh allows seeds to be suspended at a controlled height above the bottom surface of the container,
   wherein the height of the seed elevating mesh within the seed germinating container is adjustable to a plurality of positions by the user.

7. A grain germinator comprising;
   a germination container;
   a germination container lid, where the germination container lid contains an opening covered by a mesh strainer to allow water to exit the container while retaining solid contents of the container;
   a seed elevating mesh, where the seed elevating mesh allows seeds to be suspended at a controlled height above the bottom surface of the container, where the height of the seed elevating mesh within the seed germinating container is adjustable to a plurality of positions; and
   a seed bag containing a measured portion of seeds for germination, where the seed bag is made of a porous material allowing for aeration and flow of water through the bag.

\* \* \* \* \*